United States Patent [19]
Buckman

[11] 3,940,646
[45] Feb. 24, 1976

[54] SINGLE-PHASE INDUCTION MOTOR

[75] Inventor: John B. Buckman, Troy, Ohio

[73] Assignee: A. O. Smith Corporation, Milwaukee, Wis.

[22] Filed: Mar. 28, 1974

[21] Appl. No.: 455,670

[52] U.S. Cl. .............. 310/166; 310/172; 310/184; 318/220 A; 318/225 R
[51] Int. Cl.² ........................................ H02K 17/04
[58] Field of Search .......... 318/220, 222, 223, 225, 318/224 A, 220 A; 310/172, 185, 198, 197, 199–207, 184, 166

[56] References Cited
UNITED STATES PATENTS

| | | | |
|---|---|---|---|
| 771,293 | 10/1904 | Averrett............................ | 310/172 X |
| 1,269,152 | 6/1918 | Becker............................... | 310/172 |
| 2,697,810 | 12/1954 | Hutchins et al.................. | 318/220 A |
| 2,703,859 | 3/1955 | Hutchins et al.................. | 318/220 A |
| 2,864,986 | 12/1958 | Hutchins et al.................. | 318/220 A |
| 3,235,762 | 2/1966 | Brammerlo....................... | 310/198 X |

Primary Examiner—Donovan F. Duggan
Attorney, Agent, or Firm—Andrus, Sceales, Starke & Sawall

[57] ABSTRACT

A single-phase induction motor provides a plurality of serially connected main winding coils and a plurality of corresponding auxiliary winding coils each spaced in quadrature from a corresponding main winding coil. Each auxiliary winding coil is energized by the current induced in a serially connected pick-up coil located within a stator slot containing the quadrature main winding coil in response to the energization of the main winding coil for providing a starting torque to the rotor. Each auxiliary coil contains a first predetermined number of turns wound in a first direction within one stator slot and a second predetermined number of turns wound in a second direction located in an adjacent stator slot for increasing the resistance-to-reactance ratio. Each pick-up coil contains approximately one-half the turns of each auxiliary coil which, in turn, has a substantially lesser number of turns than each main coil.

9 Claims, 2 Drawing Figures

SINGLE-PHASE INDUCTION MOTOR

BACKGROUND OF THE INVENTION

This invention relates to a single-phase alternating current induction motor.

Single-phase induction motors have customarily been designed and utilized for fractional horsepower applications and have generally been classified in accordance with the methods of starting. Certain types of single-phase induction motors thus include split-phase motors, capacitor-start induction-run motors, permanent-split-capacitor motors, two-value-capacitor motors and shaded-pole motors.

Various winding methods have been employed with the single-phase induction motors to provide a desired starting torque while permitting an efficient operation at a desired rated running speed. Some motors of the shaded-pole variety utilize a salient pole stator which employs a short-circuited shading coil upon each pole portion which is directly energized by the field provided by the main winding to provide a starting torque.

Split-phase motors have employed a main or running winding and an auxiliary or starting winding which are displaced in quadrature by an angle of approximately 90 electrical degrees and are parallel connected to the single-phase power input. Such parallel connected auxiliary windings within some split-phase motors have been retained in the circuit until the rotor speed increases to approximately 75 percent of the synchronous or full running speed at which time a centrifugally operated switch disconnects the auxiliary winding so that the efficiency of the induction motor will not be effected by the presence of the auxiliary winding during a full running operation. One known split-phase motor operatively disconnects the auxiliary winding with a transformer operated switch which has a primary transformer winding serially connected to the main winding, such as shown in the Weber U.S. Pat. No. 1,433,765 issued on Oct. 31, 1922.

Various capacitor interconnections have also been employed in conjunction with auxiliary windings in order to provide a time phase displacement between the currents flowing in the main and auxiliary windings for providing a starting torque.

SUMMARY OF THE INVENTION

This invention relates to an induction motor which operates to provide a mechanical output by a rotor element when energized by a single-phase alternating current.

The induction motor of the present invention employs a main winding positioned within a first winding slot provided by a stator assembly for producing a first electrical phase axis when energized by the single-phase alternating current and an auxiliary winding positioned within a second winding slot for providing, when energized, a second electrical phase axis displaced from the first phase axis. The present invention employs a highly desirable technique for producing a starting torque upon the rotor element by providing a circuit connected to energize the auxiliary winding in response to the sensed electromagnetic field provided by the main winding.

In one aspect of the invention, a pick-up winding coil is positioned within a stator slot containing a main winding coil so as to be electromagnetically coupled thereto. The pick-up coil is connected in a series electrical circuit with the auxiliary coil for energizing the auxiliary coil whenever a current is induced within the pick-up coil by the field of the main coil caused by the single-phase alternating current input.

The phase axes provided by the main and auxiliary windings are desirably separated by a quadrature relationship of approximately 90 electrical degrees for providing the starting torque. The auxiliary coil is preferrably directly connected to the corresponding pick-up coil in a series electrical circuit and is continually energized in response to the induced current within the pick-up coil during both the starting and running sequences of the motor.

In a preferred and highly novel construction, the auxiliary coil will contain approximately twice as many turns as the pick-up coil and further contains a substantial lesser number of turns than provided by the main winding coil.

In another aspect of the invention, the auxiliary winding is wound within a plurality of winding slots provided by the stator assembly and includes a coil having a first predetermined number of turns wound in a first direction located within one winding slot and a second predetermined number of turns wound in a second direction located in an adjacent winding slot. With such a winding technique, the second direction or back-winding may be employed within a normally unused stator slot which permits the auxiliary winding to provide a substantial increase in resistance without requiring a reduction in the cross-sectional area of the wire which may otherwise unduly add to the heating of the motor. The field of the second direction or back-winding also couples with the field of the forward direction winding to substantially reduce the total reactance so that the auxiliary coil experiences a high resistance-to-reactance ratio for developing a very desirable starting torque.

In a preferred form of the invention, the main winding includes a plurality of coils serially connected and positioned within a plurality of winding slots within the stator assembly for providing a corresponding plurality of alternating electrical main flux signals having phase axes spaced with respect to each other. The plurality of main coils are wound so that each main phase axis is oppositely polarized with the respect to an immediately adjacent main phase axis. The auxiliary windings include an auxiliary coil for each main winding coil. The plurality of auxiliary coils are connected together within an electrical series circuit and are positioned within a plurality of stator slots for providing a plurality of alternating electrical auxiliary flux signals having axes spaced with respect to each other. Each auxiliary phase axis is spaced in quadrature by approximately 90 electrical degrees from a corresponding one of the main phase axes. The pick-up windings include a plurality of coils each corresponding to the one of the main winding coils. Each pick-up coil is placed within a stator slot containing at least a portion of a main winding coil so as to be electromagnetically coupled therewith. Thus for each main winding coil, an accompanying pick-up coil is electromagnetically coupled therewith in which a current is induced in response to the energization of the main winding coil by the single-phase alternating current applied from an external source. The induced current within the pick-up winding coil is supplied through the series circuit to the associated auxiliary winding coil for generating the flux signal having an electrical phase axis which is approximately in quadrature with the electrical phase axis supplied by the flux signal generated by the main winding coil. In the preferred form of the invention, the plurality of auxiliary coils and the plurality of pick-up coils are connected together in a series isolated circuit although one skilled in the art could connect a common or ground connection to certain points within the series circuit without altering the operation.

The subject invention thus provides a motor which can be built to have any number of selected electrical poles customarily utilized by single-phase alternating current induction motors. The invention provides an economical circuit construction having a highly desirable starting torque which may be continually connected in circuit during the rated running stage without appreciably detracting from the operating efficiency. The elimination of disconnect switches and capacitive type elements greatly simplifies the construction of the motor which may therefore be constructed with a substantial reduction in cost.

BRIEF DESCRIPTION OF THE DRAWING

The drawing furnished herewith illustrates the best mode presently contemplated by the inventor and clearly discloses the above advantages and features, as well as others which will be readily understood from the detailed description thereof.

In the drawing.

DESCRIPTION OF THE PREFERRED ILLUSTRATED EMBODIMENT

Figure 1:
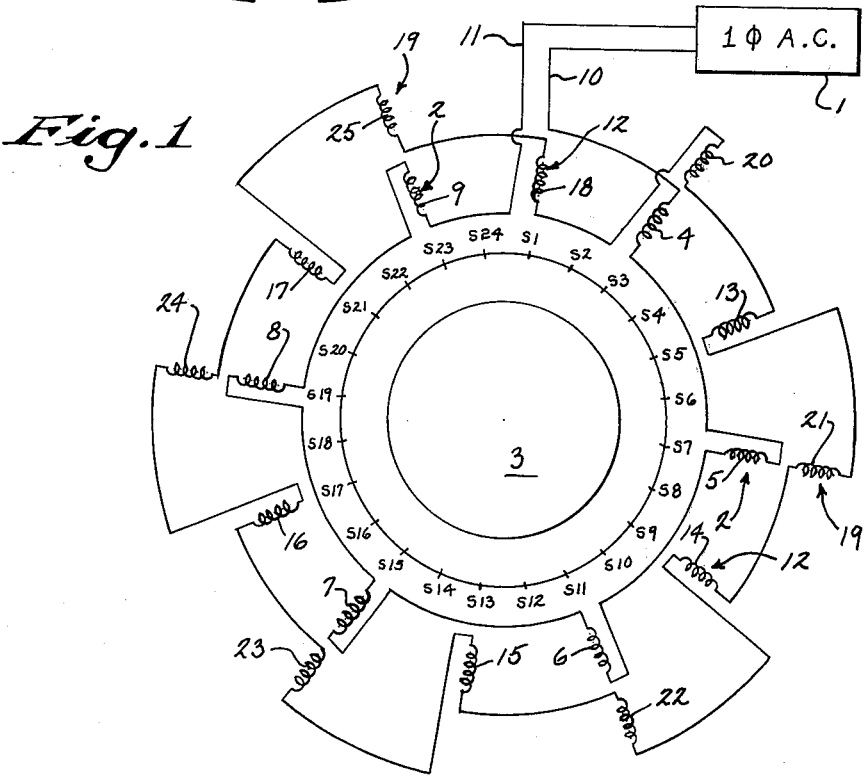
FIG. 1 is a diagrammatical electrical schematic of a single-phase induction motor illustrating the location of a plurality of electrical coil axes.

Referring to the drawing and particularly FIG. 1, a single-phase alternating current electrical source 1 is connected through a switch or other connecting means (not shown) to energize a main winding 2 for creating an electromagnetic field for interacting with a rotor 3. The rotor assembly 3 may be assembled in a squirrel-cage construction commonly utilized with induction motors for providing a rotatable mechanical output to conveniently operate fans, appliances, and other fractional horsepower type applications.

The main winding 2 is wound in a distributed manner upon the stator structure to provide six electrical pole axes although it should be clearly understood that applicant's invention may be utilized with any number of pole configurations including the two and four pole constructions. The main winding 2 illustrated in FIG. 1 provides six winding pole axes 4 through 9 of which the windings are connected within a series circuit with the windings of pole axes 4, 6, and 8 wound in a first direction to provide a first polarity electromagnetic field and the windings of pole axes 5, 7 and 9 wound in an opposite or second direction to provide a second polarity electromagnetic field. A main field series circuit is thus provided from the source 1 through an input lead 10 through the serially connected main windings of the pole axes 4, 5, 6, 7, 8 and 9, the latter winding connected to the source 1 through an input lead 11.

A plurality of auxiliary or phase windings 12 are wound upon the stator assembly in a distributed manner to provide a plurality of electrical pole axes, each of which is associated with one of the main winding pole axis and spaced therefrom in quadrature or by approximately 90 electrical degrees. Specifically, an auxiliary winding pole axis 13 is spaced 90 electrical degrees from the main winding pole axis 4, an auxiliary winding pole axis 14 is spaced 90 electrical degrees from the main winding pole axis 5, an auxiliary winding pole axis 15 is spaced 90 electrical degrees from the main winding pole axis 6, an auxiliary winding pole axis 16 is spaced 90 electrical degrees from the main winding pole axis 7, an auxiliary winding pole axis 17 is spaced 90 electrical degrees from the main winding pole axis 8, and an auxiliary winding pole axis 18 is spaced 90 electrical degrees from the main winding pole axis 9.

A plurality of pick-up windings 19 are wound upon the stator assembly in a distributed manner so as to be substantially adjacent to and preferably within the same stator slots as the main windings 2 for sensing the flow of energizing current through the main windings. The pick-up windings 19 specifically include a pick-up winding pole axis 20 which is aligned with the main winding pole axis 5, a pick-up winding pole axis 21 which is aligned with the main winding pole axis 5, a pick-up winding pole axis 22 which is aligned with the main winding pole axis 6, a pick-up winding pole axis 23 which is aligned with the main winding pole axis 7, a pick-up winding pole axis 24 which is aligned with the main winding pole axis 8, and a pick-up winding pole axis 25 which is aligned with the main winding pole axis 9.

In a particularly novel arrangement, the pick-up windings 19 are connected with the auxiliary windings 12 in a series circuit for providing a highly desirable construction for starting the single-phase induction motor with the series circuit continually connected for operation after the motor has accelerated to its maximum or desired running speed without an appreciable decrease in operating efficiency. Such continual connection thus eliminates the need for various switches, disconnects, capacitor arrangements and the like which have heretofore been utilized to remove or reduce the effects of the auxiliary windings because of their heretofore severe adverse effect upon the high speed running operation. The pick-up windings at 20 through 25 are wound with the same pattern as the corresponding aligned main windings at 4 through 9, respectively, so that the pick-up windings at 20, 22 and 24 are wound to provide a first polarity output signal in response to sensed currents within the main windings at 4, 6 and 8, respectively, while the pick-up windings at 21, 23 and 25 are wound to provide a second polarity output signal in response to currents sensed within the main windings at 5, 7 and 9, respectively. The pick-up windings and the auxiliary windings are interconnected in a closed loop, serially connected circuit which is traced serially from the pick-up winding at 20 through the circuit including the auxiliary winding at 13, the pick-up winding at 21, the auxiliary winding at 14, the pick-up winding at 22, the auxiliary winding at 15, the pick-up winding at 23, the auxiliary winding at 16, the pick-up winding at 24, the auxiliary winding at 17, the pick-up winding at 25, and the auxiliary winding at 18 to the pick-up winding at 20.

Figure 2:
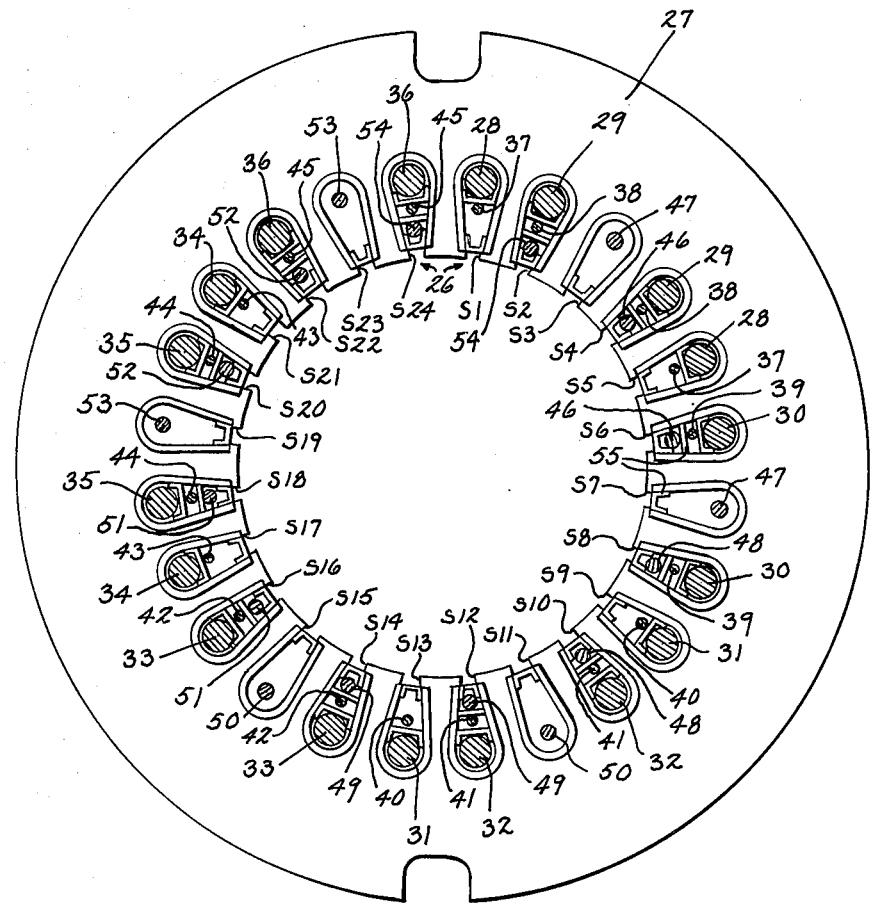
FIG. 2 is a diagrammatical illustration depicting a cross-sectional view of a wound stator assembly showing the placement of the plurality of coils having the axes illustrated in FIG. 1.

FIG. 2 illustrates the novel placement of the various windings within a plurality of stator slots 26 formed within a stator assembly 27. The 24 formed stator slots in the preferred illustrated embodiment are designated S1 through S24 in a clockwise direction although stator assemblies having varying numbers of stator slots could be utilized with applicant's invention by one skilled in the art. The main windings 2 in the preferred illustrated embodiment utilize a No. 23 gage copper wire to provide a main winding series circuit having approximately 11.74 ohms. The main winding pole axis 4 includes an outside coil 28 having 135 turns wound in a first direction within the slots S1 and S5 and an inside coil 29 having 93 turns wound in the first direction within the stator slots S2 and S4. The main pole axis 5 includes a coil 30 having 93 turns wound in a second direction within the stator slots S6 and S8 which is serially connected to the main winding at 4 including the coils 28 and 29. The main winding pole axis 6 includes an outside coil 31 having 135 turns wound in the first direction within the stator slots S9 and S13 and an inside coil 32 having 93 turns wound in the first direction within the stator slots S10 and S12. The coils 31 and 32 are serially connected to the main windings at 5 including the coil 30. The main winding pole axis 7 includes a coil 33 having 93 turns wound in the second direction within the stator slots S14 and S16 which is serially connected to the main windings at 6 including coils 31 and 32. The main winding pole axis 8 includes an outside coil 34 having 135 turns wound in the first direction within the stator slots S17 and S21 and an inside coil 35 having 93 turns wound in the first direction within the stator slots S18 and S20. The coils 34 and 35 are serially connected to the windings at 7 including the coil 33. The main winding pole axis 9 includes a coil 36 having 93 turns wound in the second direction within the stator slots S22 and S24 which is serially connected to the main windings at 8 including the coils 34 and 35.

The main winding coils 28 through 36 are thus serially connected to each other with the coils 28 and 36 connected to the single-phase alternating current source 1 throught the leads 10 and 11. The stator assembly of the preferred illustrated embodiment thus provides six main winding poles with each pole providing an oppositely polarized field with respect to the immediately adjacent poles.

The pick-up windings 19 are wound with a No. 18 gage copper wire so that the circuit provides a resistance of 0.294 ohms. The pick-up winding coils are wound in the same pattern within the same stator slots as the main winding coils 28 through 36. Thus, each pick-up winding pole axis is oppositely polarized with respect to the immediately adjacent pick-up winding pole axis.

The pick-up winding pole axis 20 includes an outside coil 37 having eight turns wound in the first direction within the stator slots S1 and S5 and an inside coil 38 having six turns wound in the first direction within the stator slots S2 and S4. The pick-up winding pole axis 21 includes a coil 39 having six turns wound in the second direction within the stator slots S6 and S8. The pick-up winding pole axis 22 includes an outside coil 40 having eight turns wound in the first direction within the stator slots S9 and S13 and an inside coil 41 having six turns wound in the first direction within the stator slots S10 and S12. The pick-up winding pole axis 23 includes a coil 42 having six turns wound in the second direction within the stator slots S14 and S16. The pick-up winding pole axis 24 includes an outside coil 43 having eight turns wound in the first direction within the stator slots S17 and S21 and an inside coil 44 having six turns wound in the first direction within the stator slots S18 and S20. The pick-up winding pole axis 25 includes the coil 45 having six turns wound in the second direction within the stator slots S22 and S24.

The auxiliary windings 12 are wound with a No. 18 gage copper wire and provide a resistance of 0.485 ohms. The auxiliary windings are wound so that each auxiliary winding pole axis is spaced from a corresponding main winding pole axis by approximately 90 electrical degrees to be substantially in quadrature therewith for providing a revolving field for starting the induction rotor 3. The auxiliary winding pole axis 13 includes an inside coil 46 having 12 turns wound in a first direction within the stator slots S4 and S6 and an outside coil 47 having 16 turns back-wound in a second direction within the stator slots S3 and S7. The auxiliary winding pole axis 14 includes a coil 48 having 12 turns wound in the second direction within the stator slots S8 and S10. The phase winding pole axis 15 includes an inside coil 49 having 12 turns wound in the first direction within the stator slots S12 and S14 and an outside coil 50 having 16 turns back-wound in the second direction within the stator slots S11 and S15. The auxiliary winding pole axis 16 includes a coil 51 having 12 turns wound in the second direction within the stator slots S16 and S18. The phase winding pole axis 17 includes an inside coil 52 having 12 turns wound in the first direction within the stator slots S20 and S22 and an outside coil 53 having 16 turns back-wound in the second direction within the stator slots S19 and S23. The auxiliary winding pole axis 18 includes a coil 54 having 12 turns wound in the second direction within the stator slots S24 and S2.

The pick-up windings 19 are connected in a highly novel manner in a series circuit with the auxiliary windings 12. The series circuit includes the pick-up coils 37 and 38 of the pick-up axis 20 serially connected with the auxiliary coils 46 and 47 of the auxiliary axis 13 which, in turn, are serially connected with the pick-up coil 39 of the pick-up axis 21 which, in turn, is serially connected with the auxiliary coil 48 of the auxiliary axis 14 which, in turn, is serially connected with the pick-up coils 40 and 41 of the pick-up axis 22 which, in turn, are serially connected with the auxiliary coils 49 and 50 of the auxiliary axis 15 which, in turn, are serially connected with the pick-up coil 42 of the pick-up axis 23 which, in turn, is serially connected with the auxiliary coil 51 of the auxiliary axis 16 which, in turn, is serially connected with the pick-up coils 43 and 44 of the pick-up axis 24 which, in turn, are serially connected with the auxiliary coils 52 and 53 of the auxiliary axis 17 which, in turn, are serially connected with the pick-up coil 45 of the pick-up axis 25 which, in turn, is serially connected with the auxiliary coil 54 of the auxiliary axis 18 which, in turn, is serially connected with the pick-up coils of 37 and 38 of the pick-up axis 20.

The pick-up windings 19 and the auxiliary windings 12 are thus interconnected in a particularly novel series type circuit which is preferrably isolated from the main windings 2. One skilled in the art could, however, connect certain junctures between the pick-up windings and the auxiliary windings to a common or reference potential such as the return lead 11 without affecting the operation although such is not the preferred mode of construction.

An important feature of the above described winding configuration is reflected in the small number of wires constituting a very low slot fill within the stator slots S3, S7, S11, S15, S19 and S23. As previously described, the outside auxiliary coils 47, 50 and 53 are back-wound into the normally open slots S3, S7, S11, S15, S19 and S23 to provide additional resistance into the circuit of the auxiliary windings 12 while reducing the reactance thereof to provide a highly desirable increased resistance-to-reactance ratio with respect to the main winding for controlling both the starting torque and the running performance of the single-phase induction motor.

A plurality of insulators such as at 55 may be utilized within the stator slots 26 to provide electrical separation between the main windings 2, the pick-up windings 19 and the auxiliary windings 12 if desired.

The invention thus provides a particularly novel single-phase induction motor in which the quadrature type auxiliary windings are wound to have an effective turns ratio of approximately 10 percent of the effective windings present in the corresponding main windings. In addition, the pick-up windings have approximately one-half as many turns as the corresponding auxiliary windings to thereby provide a highly desirable resistance-to-reactance ratio which is enhanced by portions of certain auxiliary coils being back-wound in adjacent, normally unfilled stator slots. It has been found that the angular phase axis displacement between a pick-up winding and a corresponding auxiliary winding of approximately 63 electrical degrees provides a very desirable operation.

Various modes of carrying out the invention are contemplated as being within the scope of the following claims particularly pointing out and distinctly claiming the subject matter which is regarded as the invention.

I claim:

1. A single-phase induction motor operable when energized by a single-phase alternating current, comprising rotor means providing an output, a stator assembly mounted adjacent to said rotor means and having a plurality of spaced winding slots, main winding means including a coil positioned within a first slot for providing a first electrical phase axis when energized by the single-phase alternating current, auxiliary winding means including a coil positioned within a second slot for providing when energized a second electrical phase axis displaced by approximately 90 electrical degrees from said first phase axis, and pick-up winding means including a coil separate from said auxiliary coil and positioned within the electromagnetic field of said main coil and continually connected during the starting and running sequences of said motor in series closed loop electrical circuit with said auxiliary coil to provide a starting torque to said rotor means in response to the energization of said main coil by said single-phase alternating current.

2. The induction motor of claim 1, wherein said auxiliary coil contains approximately twice as many turns as said pick-up coil.

3. The induction motor of claim 1, wherein said auxiliary coil contains a first predetermined number of turns and said main coil contains a second predetermined number of turns greater than said first predetermined number of turns.

4. A single-phase induction motor operable when energized by a single-phase alternating current, comprising rotor means providing an output, a stator assembly mounted adjacent to said rotor means and having a plurality of spaced winding slots, main winding means including a coil positioned within a first slot for providing a first electrical phase axis when energized by the single-phase alternating current, auxiliary winding means including a coil positioned within a second slot for providing when energized a second electrical phase axis displaced by approximately 90 electrical degrees from said first phase axis, and pick-up winding means including a coil positioned within said first slot and within the electromagnetic field of said main coil and continually connected during the starting and running sequences of said motor in series closed loop electrical circuit with said auxiliary coil and providing a starting torque to said rotor means in response to the energization of said main coil by said single-phase alternating current.

5. A single-phase induction motor operable when energized by a single-phase alternating current, comprising rotor means providing an output, a stator assembly mounted adjacent to said rotor means and having a plurality of spaced winding slots, main winding means including a coil positioned within a first slot for providing a first electrical phase axis when energized by the single-phase alternating current, auxiliary winding means including a coil having a first predetermined number of turns wound in a first direction located within a second slot and a second predetermined number of turns wound in a second direction located within a third slot located adjacent to said second slot and providing when energized a second electrical phase axis displaced from said first phase axis, and pick-up winding means including a coil positioned within the electromagnetic field of said main coil and continually connected during the starting and running sequences of said motor in series closed loop electrical circuit with said auxiliary coil to provide a starting torque to said rotor means in response to the energization of said main coil by said single-phase alternating current.

6. An induction motor operable when energized by a single-phase alternating current, comprising rotor means providing an output, a stator assembly mounted adjacent to said rotor means and having a plurality of spaced winding slots, main winding means including a selected plurality of coils serially connected and positioned within a plurality of first slots for providing a corresponding plurality of first electrical main phase axes spaced with respect to each other with each main phase axis oppositely polarized with respect to an immediately adjacent main phase axis when energized by the single-phase alternating current, auxiliary winding means including a plurality of coils having a number corresponding to said plurality of main coils and connected within an electrical series circuit and positioned within a plurality of second slots for providing a plurality of second electrical auxiliary phase axes spaced with respect to each other with each auxiliary phase axis spaced by approximately 90 electrical degrees from a corresponding one of said main phase axes, and pick-up winding means including a plurality of coils having a number corresponding to said plurality of main coils and continually connected during the starting and running sequences of said motor within said electrical series closed loop circuit including said auxiliary coils with each of said pick-up coils positioned within one of said slots containing one of said main coils for energizing said auxiliary winding means and providing a starting torque to said rotor means in response to the energization of said main winding means by said single-phase alternating current.

7. A single-phase induction motor operable when energized by a single-phase alternating current, comprising rotor means providing an output, a stator assembly mounted adjacent to said rotor means and having a plurality of spaced winding slots, main winding means positioned within a first slot and providing a first electrical phase axis when energized by the single-phase alternating current, auxiliary winding means positioned within a second slot and providing when energized a second electrical phase axis displaced by approximately ninety electrical degrees from said first phase axis, means separate from said auxiliary winding means and coupled for sensing the electromagnetic field of said main winding means, and circuit means continually connecting in series closed loop circuit during the starting and running sequences of said motor said field sensing means and said auxiliary winding means and energizing said auxiliary winding means in response to the sensed electromagnetic field provided by said main winding means to provide a starting torque to said rotor means.

8. An induction motor operable when energized by a single-phase alternating current, comprising rotor means providing an output, a stator assembly mounted adjacent to said rotor means and having a plurality of spaced winding slots, main winding means includings a coil positioned within a first slot for providing a first electrical phase axis, auxiliary winding means including a coil having a substantially lesser number of turns than said main coil for providing a second electrical phase axis displaced from said first phase axis by approximately 90 electrical degrees and having a first predetermined number of turns wound in a first direction located within a second slot and a second predetermined number of turns wound in a second direction located within a third slot adjacent to said second slot, and pick-up means including a coil having approximately one-half as many turns as said auxiliary coil and positioned within said first slot to be electromagnetically coupled to said main coil and directly connected in series closed loop electrical circuit with said auxiliary coil for continually energizing said auxiliary coil in response to the induced current in said pick-up coil during the starting and running sequences of said motor to provide a starting torque to said rotor means during the starting sequence in response to the energization of said main coil by said single-phase alternating current.

9. The induction motor of claim 8, wherein said main winding means includes a selected plurality of coils serially connected and positioned within a plurality of corresponding slots for providing a corresponding plurality of electrical main phase axes spaced with respect to each other with each main phase axis oppositely polarized with respect to an immediately adjacent main phase axis, said auxiliary winding means includes a plurality of coils having a number corresponding to said plurality of main coils and connected within an electrical series circuit and positioned within a plurality of slots for providing a plurality of electrical auxiliary phase axes spaced with respect to each other with each auxiliary phase axis spaced by approximately 90 electrical degrees from a corresponding one of said main phase axes, and said pick-up means includes a plurality of coils having a number corresponding to said plurality of main coils and connected within said electrical series circuit including said auxiliary coils with each of said pick-up coils positioned within one of said slots containing one of said main coils.

* * * * *